US011907409B2

(12) United States Patent
Maddukuri et al.

(10) Patent No.: US 11,907,409 B2
(45) Date of Patent: Feb. 20, 2024

(54) DYNAMIC IMMUTABLE SECURITY PERSONALIZATION FOR ENTERPRISE PRODUCTS

(71) Applicant: Dell Products L.P., Round Rock, TX (US)

(72) Inventors: Akkiah Choudary Maddukuri, Austin, TX (US); Marshal Frederick Savage, Austin, TX (US); Eugene David Cho, Austin, TX (US); Sreeram Veluthakkal, Pflugerville, TX (US); Timothy M. Lambert, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 136 days.

(21) Appl. No.: 17/488,613

(22) Filed: Sep. 29, 2021

(65) Prior Publication Data

US 2023/0098608 A1 Mar. 30, 2023

(51) Int. Cl.
*G06F 21/73* (2013.01)
*G11C 17/12* (2006.01)
*G11C 17/16* (2006.01)
*G06F 21/79* (2013.01)

(52) U.S. Cl.
CPC ............. *G06F 21/73* (2013.01); *G06F 21/79* (2013.01); *G11C 17/12* (2013.01); *G11C 17/16* (2013.01)

(58) Field of Classification Search
CPC ......... G06F 21/73; G06F 21/79; G11C 17/12; G11C 17/16
See application file for complete search history.

(56) References Cited

U.S. PATENT DOCUMENTS

| 9,305,185 B1* | 4/2016 | Pedersen ............... G06F 21/575 |
| 2009/0295461 A1* | 12/2009 | Cesare .................... H05K 3/222 |
| | | 327/524 |
| 2010/0057960 A1* | 3/2010 | Renno ................. G06F 12/1433 |
| | | 710/262 |
| 2014/0253222 A1* | 9/2014 | Merchant ............... G06F 21/44 |
| | | 327/525 |
| 2015/0261692 A1* | 9/2015 | Benedetti ............ G06F 12/1433 |
| | | 713/193 |
| 2015/0261966 A1* | 9/2015 | Mensch ............. H04L 63/0876 |
| | | 713/189 |
| 2016/0049207 A1* | 2/2016 | Gulati ...................... G11C 7/20 |
| | | 365/96 |

(Continued)

*Primary Examiner* — Michael R Vaughan
*Assistant Examiner* — Ethan V Vo
(74) *Attorney, Agent, or Firm* — Chamberlain, Hrdlicka, White, Williams & Aughtry; Aly Z. Dossa (57) ABSTRACT

A method for dynamic immutable security personalization for enterprise products. Specifically, the disclosed method describes how a computer processor (e.g., baseboard management controller) of an enterprise product can personalize security requirements in trusted facilities, along the supply chain route of the enterprise product, so that trusted assumptions concerning the enterprise product can be made. Further, through dynamic immutable security personalization, these trusted assumptions are allowed to change over time (e.g., from being less restrictive to more restrictive) as changing enterprise product configuration states are captured while the enterprise product traverses the supply chain route.

16 Claims, 8 Drawing Sheets

(56) References Cited

U.S. PATENT DOCUMENTS

| | | | |
|---|---|---|---|
| 2016/0378996 A1* | 12/2016 | Smith | G06F 21/72 |
| | | | 713/190 |
| 2017/0277546 A1* | 9/2017 | Scholze | G06F 12/1458 |
| 2018/0189493 A1* | 7/2018 | Schilder | G01R 31/31719 |
| 2019/0236279 A1* | 8/2019 | Depew | G06F 9/44505 |
| 2021/0051010 A1* | 2/2021 | Yang | H04L 9/0866 |
| 2021/0193241 A1* | 6/2021 | Jung | G11C 17/18 |
| 2021/0390180 A1* | 12/2021 | Zargar | G06F 11/2247 |

\* cited by examiner

DYNAMIC IMMUTABLE SECURITY PERSONALIZATION FOR ENTERPRISE PRODUCTS

BACKGROUND

In the past, hardware (through general purpose input-output state, programmable logic arrays, and installed card detection) has been relied upon to allow firmware to make programmatic assumptions concerning enterprise product security. However, trusting the hardware is both problematic (due, for example, to tampering susceptibility from malicious actors) and inflexible in meeting the demands of modern security-oriented customer facing features.

SUMMARY

In general, in one aspect, the invention relates to a method for enterprise product configuration tracking. The method includes having an enterprise product arrive at a lifecycle site; ascertaining, for the enterprise product, a current enterprise product configuration state; generating a site bitmask capturing at least a portion of the current enterprise product configuration state; and preserving, immutably, the at least portion of the current enterprise product configuration state using the site bitmask.

In general, in one aspect, the invention relates to a non-transitory computer readable medium (CRM). The non-transitory CRM includes computer readable program code, which when executed by a computer processor, enables the computer processor to perform a method for enterprise product configuration tracking. The method includes having an enterprise product arrive at a lifecycle site; ascertaining, for the enterprise product, a current enterprise product configuration state; generating a site bitmask capturing at least a portion of the current enterprise product configuration state; and preserving, immutably, the at least portion of the current enterprise product configuration state using the site bitmask.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to dynamic immutable security personalization for enterprise products. Specifically, the disclosed method describes how a computer processor (e.g., baseboard management controller) of an enterprise product can personalize security requirements in trusted facilities, along the supply chain route of the enterprise product, so that trusted assumptions concerning the enterprise product can be made. Further, through dynamic immutable security personalization, these trusted assumptions are allowed to change over time (e.g., from being less restrictive to more restrictive) as changing enterprise product configuration states are captured while the enterprise product traverses the supply chain route.

Figure 1:
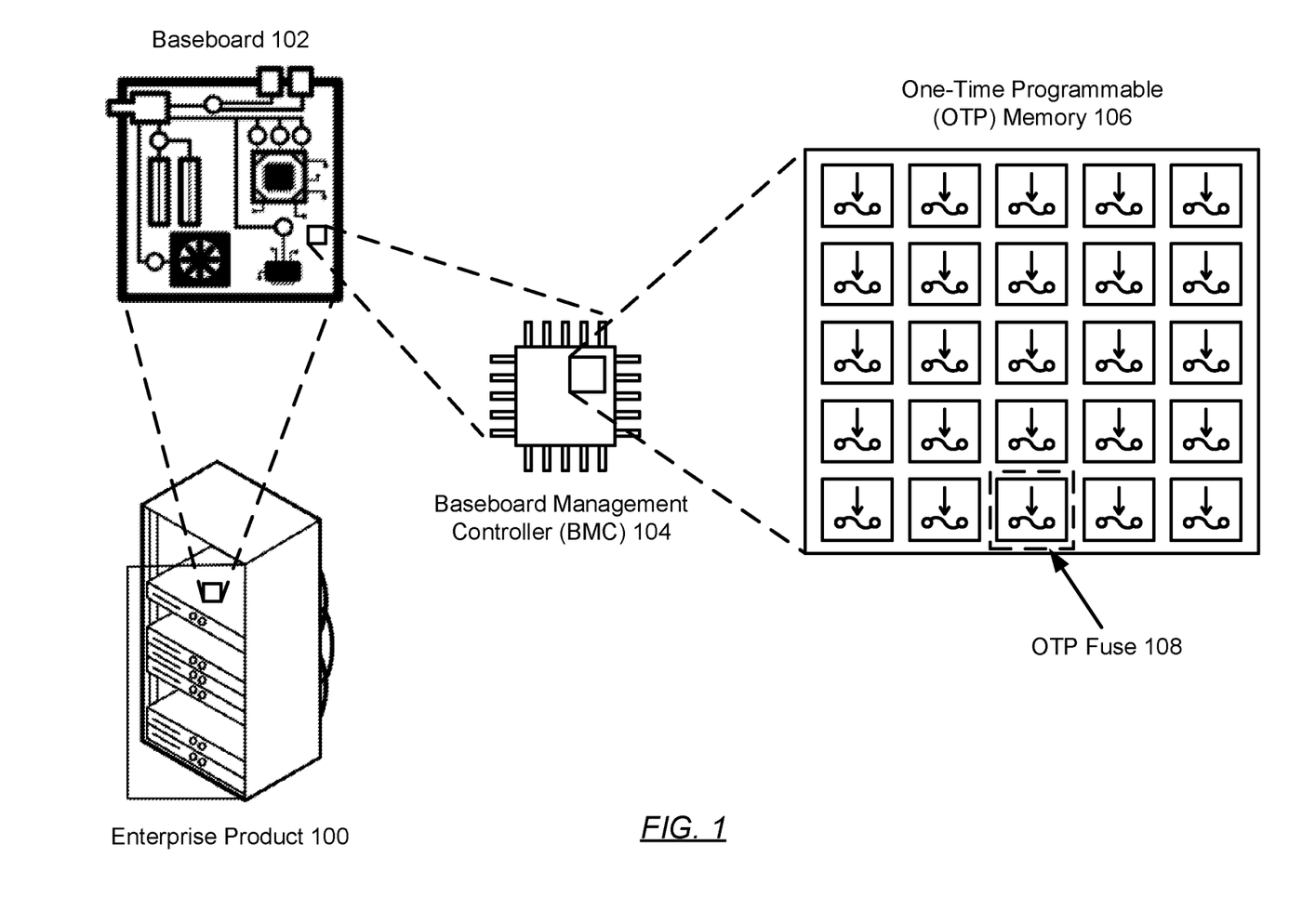
FIG. 1 shows an enterprise product in accordance with one or more embodiments of the invention.

FIG. 1 shows an enterprise product in accordance with one or more embodiments of the invention. An enterprise product (100) may reference computer hardware, software, and/or firmware configured to implement and support enterprise-class (e.g., datacenter-level) information technology (IT) infrastructure and services. Examples of an enterprise product (100) may include, but are not limited to, a network server, a computer mainframe, or any computing system similar to the exemplary computing system shown in FIG. 6.

In one embodiment of the invention, an enterprise product (100) may include a baseboard (102) (also referred to as a motherboard). The baseboard (102) may represent a main printed circuit board (PCB), which may serve as the *nexus* of interconnection between the various other components, of the enterprise product (100). The baseboard (102) may provide sockets and solder pads to which any number of electronic and/or electro-mechanical components may be mounted thereon. Examples of these aforementioned components may include, but are not limited to, a central processing unit (CPU), varying types of computer memory (e.g., volatile and non-volatile), as well as expansion card slots and/or interfaces to peripheral devices (e.g., graphics adapters, network adapters, etc.), sensors, storage devices, cooling fans, and front/back panel ports.

In one embodiment of the invention, a baseboard (102) may further include a baseboard management controller (BMC) (104) thereon, which may interface with varying components of the enterprise product (100). The BMC (104) may reference a specialized computer processor (e.g., a system on chip (SoC)) that may integrate all or most components of a computing system (see e.g., FIG. 6) therein. Further, the BMC (104) may often be used for the remote monitoring and management of the enterprise product (100) and, accordingly, may include functionality to ascertain hardware, software, and/or firmware configuration state of the enterprise product (100) at any point-in-time (granted the enterprise product (100) is powered).

In one embodiment of the invention, the BMC (104) may, amongst other forms of computer memory, include one-time programmable (OTP) memory (106). OTP memory (106) is special non-volatile memory that permits the one-time write of data therein—thereby enabling immutable data storage. Immutable data storage, accordingly, may refer to the storage of data in a form that can never be tampered with, modified, or removed. The OTP memory (106) may, for example, be implemented as a collection or matrix of contiguous memory cells each referred to as an OTP fuse (108). Furthermore, the OTP memory (106) may be programmed, by the BMC (104), to immutably retain hardware, software, and/or firmware configuration state pertaining to the enterprise product (100) in accordance with one or more embodiments of the invention disclosed herein (see e.g., FIG. 4).

While FIG. 1 shows a configuration of components, other enterprise product (100) configurations may be used without departing from the scope of the invention.

Figure 2:
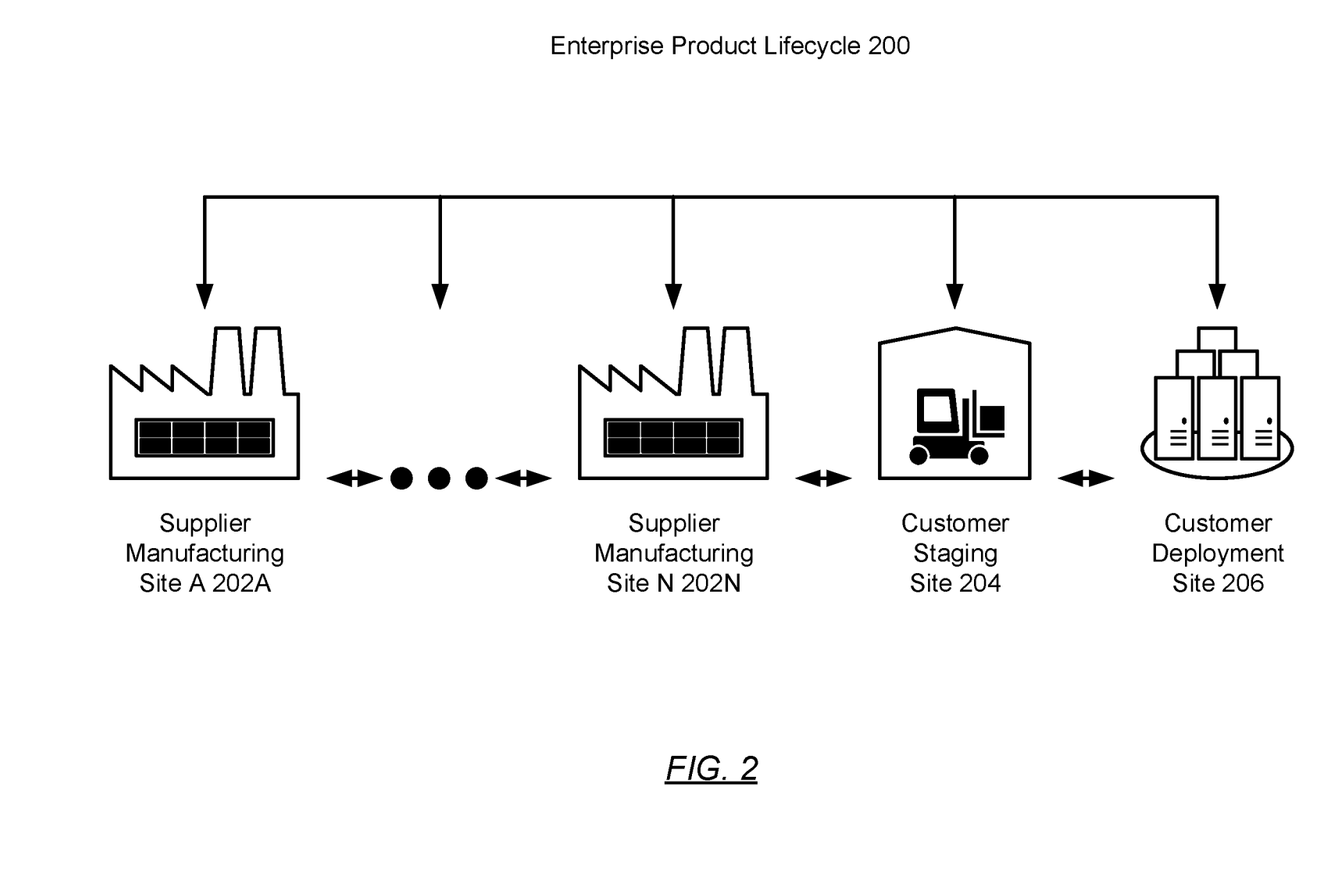
FIG. 2 shows an exemplary enterprise product lifecycle in accordance with one or more embodiments of the invention.

FIG. 2 shows an exemplary enterprise product lifecycle in accordance with one or more embodiments of the invention. An enterprise product lifecycle (200) may reference the supply chain route that may be traversed by an enterprise product (described above) (see e.g., FIG. 1). A supply chain route, in turn, may outline a sequence of trusted facilities (or sites) through which the enterprise product transitions during its lifetime. These trusted facilities may include, but are not limited to, one or more supplier manufacturing sites (202A-202N), a customer staging site (204), and a customer deployment site (206). Each of these enterprise product lifecycle (200) stages is described below.

In one embodiment of the invention, a supplier manufacturing site (202A-202N) may reference a trusted facility where a supplier of the enterprise product may manufacture the enterprise product in part or in entirety. Manufacturing of an enterprise product may, for example, entail the following stages (or levels): (1) manufacturing of chassis and front panel parts; (2) subassembly of the chassis parts to obtain a chassis; (3) integration of the chassis and the front panel parts to obtain a chassis enclosure; (4) procurement of a power supply and/or cables and/or a backplane; (5) integration of the power supply and/or the cables and/or the backplane into the chassis enclosure; (6) procurement of a baseboard and integration thereof into the chassis enclosure; (7) procurement of one or more expansion cards and integration thereof into the chassis enclosure; (8) procurement of one or more storage devices and integration thereof into the chassis enclosure; (9) procurement of computer processors (e.g., central processing unit (CPU), baseboard management controller (BMC), etc.) as well as computer memory and integration thereof into the chassis enclosure to obtain a fully-assembled enterprise product; and (10) installation of an operating system (OS), zero or more software applications, and/or firmware onto the fully-assembled enterprise product to obtain a fully-integrated enterprise product.

In one embodiment of the invention, the above-mentioned enterprise product manufacturing stages may be performed across one or many supplier manufacturing sites (202A-202N). Further, the supplier manufacturing site(s) (202A-202N) may also include functionality to service, upgrade, troubleshoot, test, package, and/or distribute the enterprise product. One of ordinary skill will appreciate that the supplier manufacturing site(s) (202A-202N) may perform other responsibilities without departing from the scope of the invention.

In one embodiment of the invention, the customer staging site (204) may reference a trusted facility where a customer of the enterprise product may stage the enterprise product. Staging of an enterprise product may, for example, entail the following processes: (a) receipt of the enterprise product from a supplier; (b) inspection and/or testing of the enterprise product; and (c) placement of the enterprise product into inventory until ready for deployment. Additionally, the customer staging site (204) may include functionality to receive a deployed enterprise product back from the customer deployment site (206), and return the aforementioned enterprise product to the supplier manufacturing site(s) (202A-202N) for servicing, upgrading, and/or troubleshooting. One of ordinary skill will appreciate that the customer staging site (204) may perform other responsibilities without departing from the scope of the invention.

In one embodiment of the invention, the customer deployment site (206) may reference a trusted facility where a customer of the enterprise product may deploy the enterprise product. Deployment of an enterprise product may, for example, entail integration of the enterprise product into a customer data center, and the subsequent activation of the enterprise product therein. The customer deployment site (206) may further include functionality to return a deployed enterprise product to the customer staging site (204) or any supplier manufacturing site (202A-202N) for servicing, upgrading, and/or troubleshooting.

While FIG. 2 shows a configuration of stages, other enterprise product lifecycle (200) configurations may be used without departing from the scope of the invention.

Figure 3A:
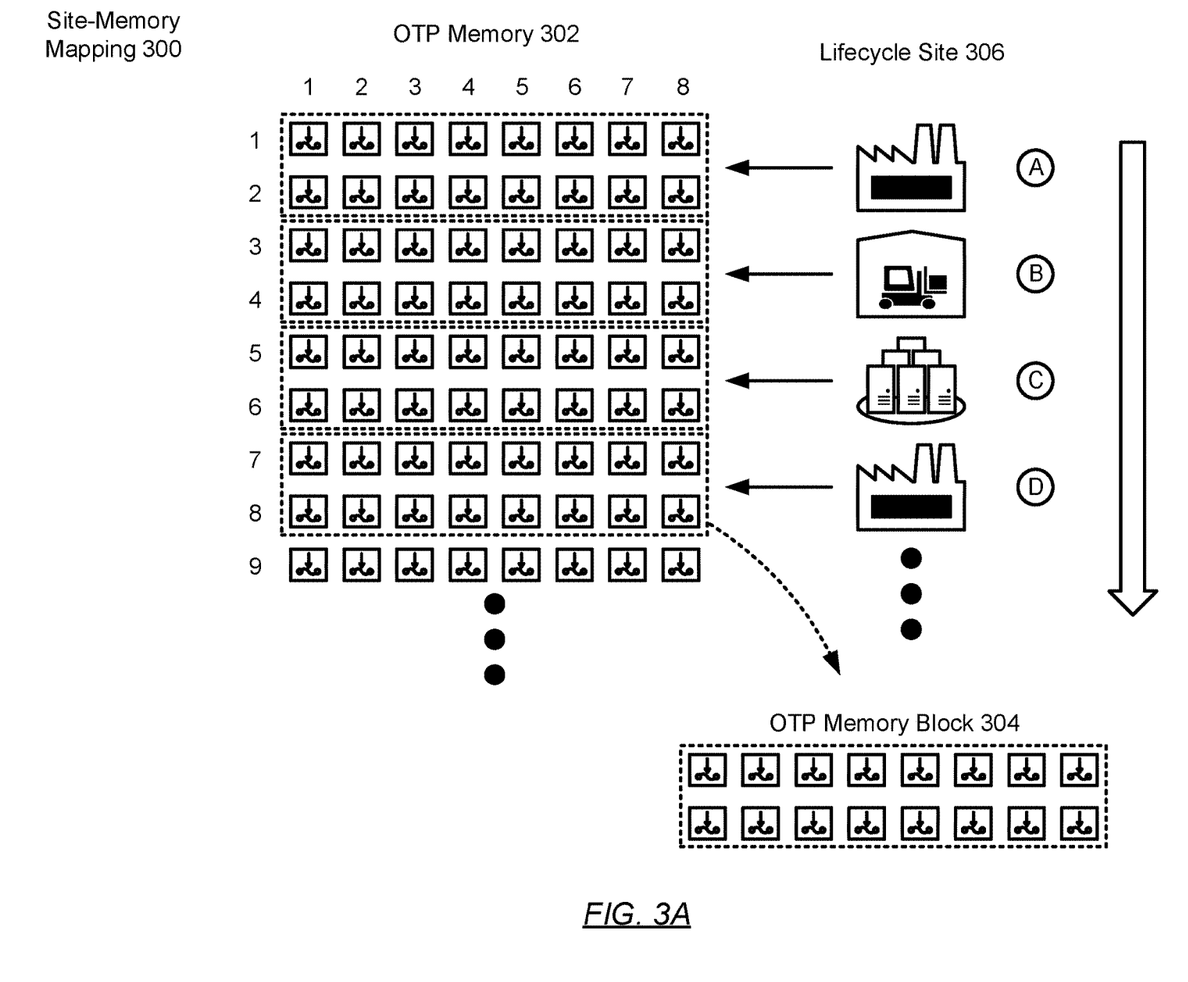
FIG. 3A shows a site-memory mapping in accordance with one or more embodiments of the invention.

FIG. 3A shows a site-memory mapping in accordance with one or more embodiments of the invention. The site-memory mapping (300) may represent a scheme relating the lifecycle site(s) (306), visited by an enterprise product during its lifetime, to partition(s) in the one-time programmable (OTP) memory (302) of the baseboard management controller (BMC) (see e.g., FIG. 1). Further, each of the aforementioned partitions may hereinafter be referred to as an OTP memory block (304), which, in turn, may encompass a pre-established size (or number) of contiguous OTP fuses in the OTP memory (302).

In one embodiment of the invention, the pre-established size (or number) of contiguous OTP fuses forming an OTP memory block (304) may be set during a design stage or an early manufacturing stage of the enterprise product. Moreover, an order or sequence of each OTP memory block (304), within the OTP memory (302), may follow the order or sequence of lifecycle site(s) (306) visited by the enterprise product. That is, by way of the non-limiting example illustrated in FIG. 3A, an enterprise product may migrate sequentially through at least the following lifecycle sites (306): (a) a supplier manufacturing site; (b) a customer staging site; (c) a customer deployment site; and (d) the supplier manufacturing site again. Accordingly, in alignment with the aforementioned sequence of lifecycle sites (306), OTP memory blocks (304), corresponding to the lifecycle sites (306), may also be located relative to one another per the same sequence. Details concerning an OTP memory block (304) is described in FIG. 3B, below.

While FIG. 3A shows the OTP memory (302) having a certain dimension (e.g., 9+ OTP fuses by 8 OTP fuses), one of ordinary skill will appreciate that the OTP memory (302), available on the BMC, may be vastly greater in size. Also, though each OTP memory block (304) is shown to include a certain set of contiguous OTP fuses, one of ordinary skill will appreciate that each OTP memory block (304) may include less or more contiguous OTP fuses than the size or number shown.

Figure 3B:
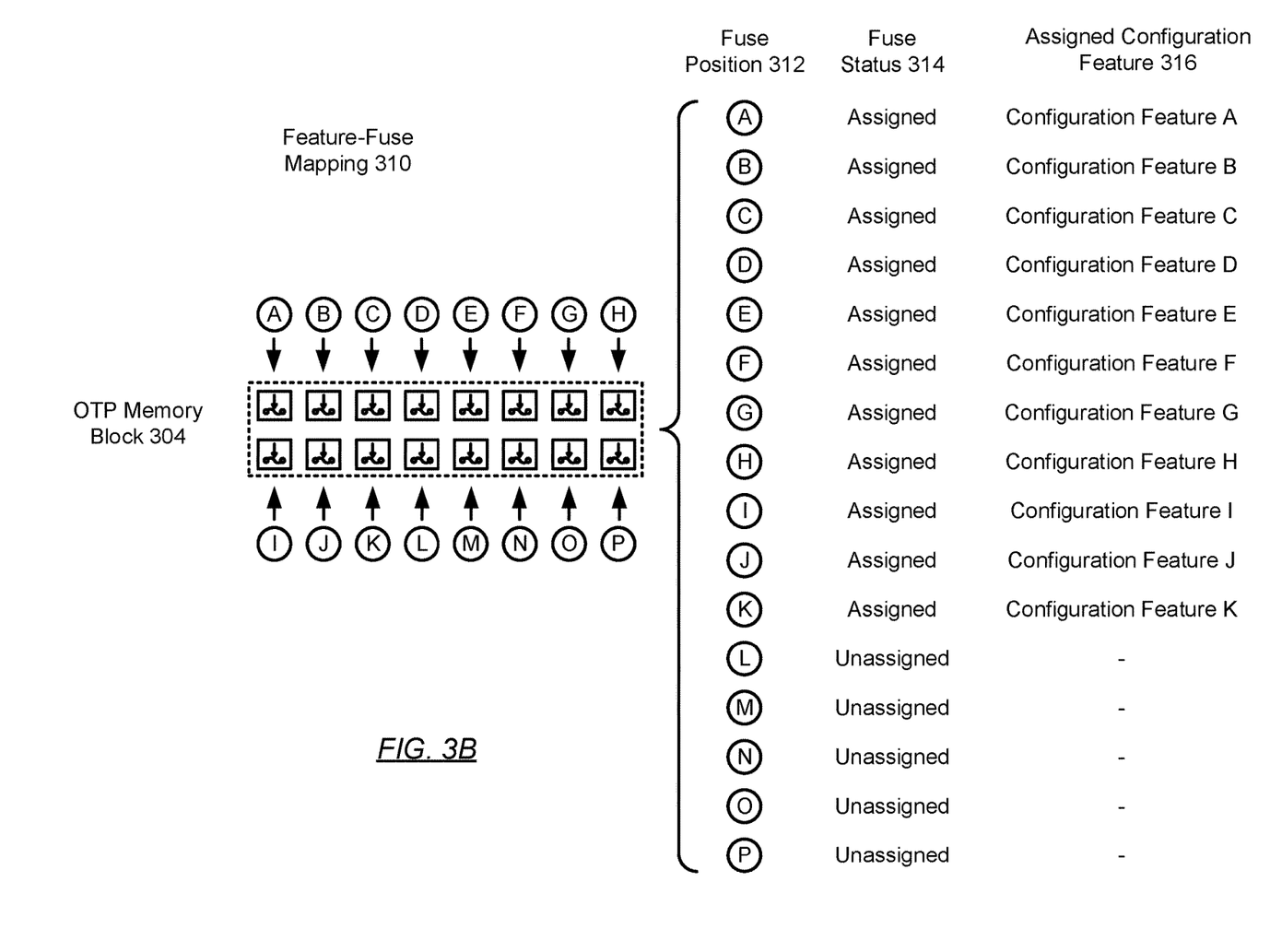
FIG. 3B shows a feature-fuse mapping in accordance with one or more embodiments of the invention.

FIG. 3B shows a feature-fuse mapping in accordance with one or more embodiments of the invention. The feature-fuse mapping (310) may represent a scheme relating fuse positions (312), for one-time programmable (OTP) fuses forming an OTP memory block (304) (see also, FIG. 3A), to enterprise product configuration features (316) desired to be tracked.

In one embodiment of the invention, a fuse position (312) of a given OTP fuse may reference the fixed location of the given OTP fuse, relative to other OTP fuses, within any given OTP memory block (304). Meanwhile, an enterprise product configuration feature (316) may reference a hardware, software, or firmware feature that may or may not be installed or enabled on the enterprise product. Examples of an enterprise product configuration feature (316) may include, but are not limited to, the installation of a hardware security chip, the enablement of a basic input-output system (BIOS) secure boot, the enablement of a complex programmable logic device (CPLD) secure boot, the enablement of a system lockdown mode, the enablement of a subsystem attestation failure continued boot versus a halt policy, and the enablement of a specific debug access path.

In one embodiment of the invention, each OTP fuse of any given OTP memory block (304) may exhibit a fuse status (314). The fuse status (314) of an OTP fuse may indicate whether the OTP fuse has been associated with or assigned an enterprise product configuration feature (316). Accordingly, not all OTP fuses of a given OTP memory block (304) may be assigned to an enterprise product configuration feature (316) at any given time; rather, zero or more OTP fuses may be reserved for the prospective tracking of zero or more enterprise product configuration features (316), respectively, which is/are yet of interest.

While FIG. 3B shows a layout of a feature-fuse mapping (310), other feature-fuse mappings (not shown) may be used without departing from the scope of the invention.

Figure 3C:
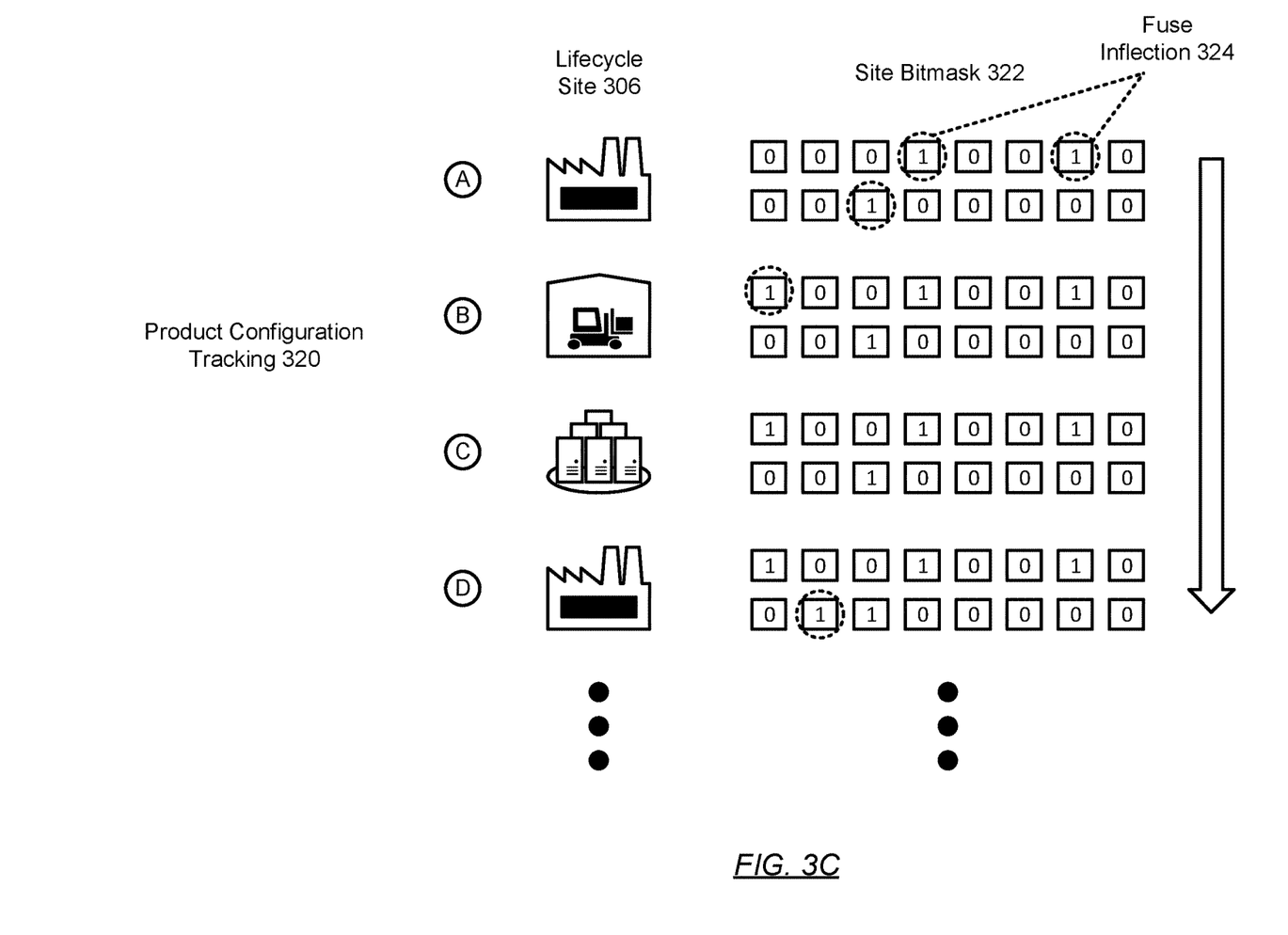
FIG. 3C shows product configuration tracking in accordance with one or more embodiments of the invention.

FIG. 3C shows product configuration tracking in accordance with one or more embodiments of the invention. Product configuration tracking (320) may reference a scheme through which the enterprise product configuration state of an enterprise product, as the enterprise product migrates sequentially through a set of lifecycle sites (306), may be immutably preserved in the one-time programmable (OTP) memory of the baseboard management controller (BMC) (not shown).

In one embodiment of the invention, programming of the OTP memory to immutably preserve the various changing or unchanging enterprise product configuration states may be facilitated through the use of site bitmask(s) (322). A site bitmask (322) may represent a set of binary digits reflective of at least a portion of a current enterprise product configuration state (captured while the enterprise product resides at a given lifecycle site (306)). Each binary digit of the set of binary digits may reflect a set value (i.e., a binary one) or a clear value (i.e., a binary zero), and may map to a given enterprise product configuration feature (described above) (see e.g., FIG. 3B), which has been pre-selected to be immutably tracked.

To better comprehend product configuration tracking (320), consider the following non-limiting example aided by the illustrations portrayed in FIGS. 3A-3C. Foremost, suppose an enterprise product migrates sequentially through at least the following lifecycle sites (306): (a) a supplier manufacturing site; (b) a customer staging site; (c) a customer deployment site; and (d) the supplier manufacturing site again.

While at the supplier manufacturing site (a), a first site bitmask (322-a) may be generated to reflect that Configuration Features D, G, and K (316) (see e.g., FIG. 3B) are each either installed or enabled on the enterprise product. The first site bitmask (322-a), accordingly, may include binary digits with set values corresponding to Fuse Positions D, G, and K (312) of an OTP memory block (304). Preservation of this first enterprise product configuration state may subsequently entail the application of the first site bitmask (322-a), via a bitwise operation, to a yet to be programmed (or available) OTP memory block (304) of the OTP memory (302) (see e.g., FIG. 3A).

Further, while at the customer staging site (b), a second site bitmask (322-b) may be generated to reflect that Configuration Features A, D, G, and K (316) (see e.g., FIG. 3B) are each either installed or enabled on the enterprise product. The second site bitmask (322-b), accordingly, may include binary digits with set values corresponding to Fuse Positions A, D, G, and K (312) of an OTP memory block (304). Preservation of this second enterprise product configuration state may subsequently entail the application of the second site bitmask (322-b), via a bitwise operation, to a next available OTP memory block (304) of the OTP memory (302) (see e.g., FIG. 3A). Note that the second site bitmask (322-b) registers one difference or change from the first site bitmask (322-a), which captures the installation or enablement of Configuration Feature A (316). Installation or enablement of Configuration Feature A on the enterprise product may have resulted from an authorized modification of the enterprise product at the customer staging site (b); from unauthorized, detectable tampering of the enterprise product that may have transpired while the enterprise product had been at the supplier manufacturing site (a), at the customer staging site (b), or anywhere there-between, following the generation and application of the first site bitmask (322-a) and prior to the generation and application of the second site bitmask (322-b); or from any unforeseen circumstance (e.g., damaged or missing hardware, malfunctioning sensors, effects from a security intrusion, etc.) that may have occurred between the generation and application of the first site and second site bitmasks (322-a, 322-b).

Further still, while at the customer deployment site (c), a third site bitmask (322-c) may be generated to reflect that Configuration Features A, D, G, and K (316) (see e.g., FIG. 3B) are each either installed or enabled on the enterprise product. The third site bitmask (322-c), accordingly, may include binary digits with set values corresponding to Fuse Positions A, D, G, and K (312) of an OTP memory block (304). Preservation of this third enterprise product configuration state may subsequently entail the application of the third site bitmask (322-c), via a bitwise operation, to a next available OTP memory block (304) of the OTP memory (302) (see e.g., FIG. 3A). Note that the third site bitmask (322-c) registers no differences or changes from the second site bitmask (322-b). This scenario may transpire when no authorized modifications to the enterprise product take place at the customer deployment site (c); when no unauthorized, detectable tampering of the enterprise product is logged; or when no unforeseen circumstances occur between the generation and application of the second site and third site bitmasks (322-b, 322-c).

Moreover, while at the supplier manufacturing site again (d) (e.g., for servicing, upgrading, and/or troubleshooting of the enterprise product), a fourth site bitmask (322-d) may be generated to reflect that Configuration Features A, D, G, J, and K (316) (see e.g., FIG. 3B) are each either installed or enabled on the enterprise product. The fourth site bitmask (322-d), accordingly, may include binary digits with set values corresponding to Fuse Positions A, D, G, J, and K (312) of an OTP memory block (304). Preservation of this fourth enterprise product configuration state may subsequently entail the application of the fourth site bitmask (322-b), via a bitwise operation, to a next available OTP memory block (304) of the OTP memory (302) (see e.g., FIG. 3A). Note that the fourth site bitmask (322-d) registers one difference or change from the third site bitmask (322-c), which captures the installation or enablement of Configuration Feature J (316). Installation or enablement of Configuration Feature J on the enterprise product may have resulted from an authorized modification of the enterprise product at the second visitation of the supplier manufacturing site (d); from unauthorized, detectable tampering of the enterprise product that may have transpired while the enterprise product had been at the customer deployment site (c), at the second visitation of the supplier manufacturing site (d), or anywhere there-between, following the generation and application of the third site bitmask (322-c) and prior to the generation and application of the fourth site bitmask (322-d); or from any unforeseen circumstance (e.g., damaged or missing hardware, malfunctioning sensors, effects from a security intrusion, etc.) that may have occurred between the generation and application of the third site and fourth site bitmasks (322-c, 322-d).

In one embodiment of the invention, any difference(s) or change(s) between any two sequential site bitmasks (322) (and/or the preservation of the difference(s)/change(s) via a programmed OTP memory block (304)), which may reflect modification(s) to the captured enterprise product configuration state between any two sequential lifecycle site (306) visitations, respectively, may be referred to herein as a fuse (or OTP fuse) inflection (324). In the above-described non-limiting example, fuse inflections (324) are indicated: at Fuse Positions D, G, and K (312) on the first site bitmask (322-a); at Fuse Position A (312) on the second site bitmask (322-b); and at Fuse Position J (312) on the fourth site bitmask (322-d). Fuse inflection(s) (324) may be useful to a human component in ascertaining where, along the unique supply chain route of an enterprise product, did modification(s) to the enterprise product take place.

In one embodiment of the invention, in order to ascertain the enterprise product configuration state at a given point-in-time, a cumulative OTP memory block (not shown), may be derived. A cumulative OTP memory block may be derived from applying a bitwise OR operation amongst any set of two or more previously programmed OTP memory blocks, where the set of previously programmed OTP memory blocks correspond to any set of two or more sequential lifecycle sites (306), respectively, visited by the enterprise product. A cumulative OTP memory block, accordingly, may reflect the enterprise product configuration state at the given point-in-time, following traversal of the enterprise product through the aforementioned set of sequential lifecycle sites (306).

Figure 4:
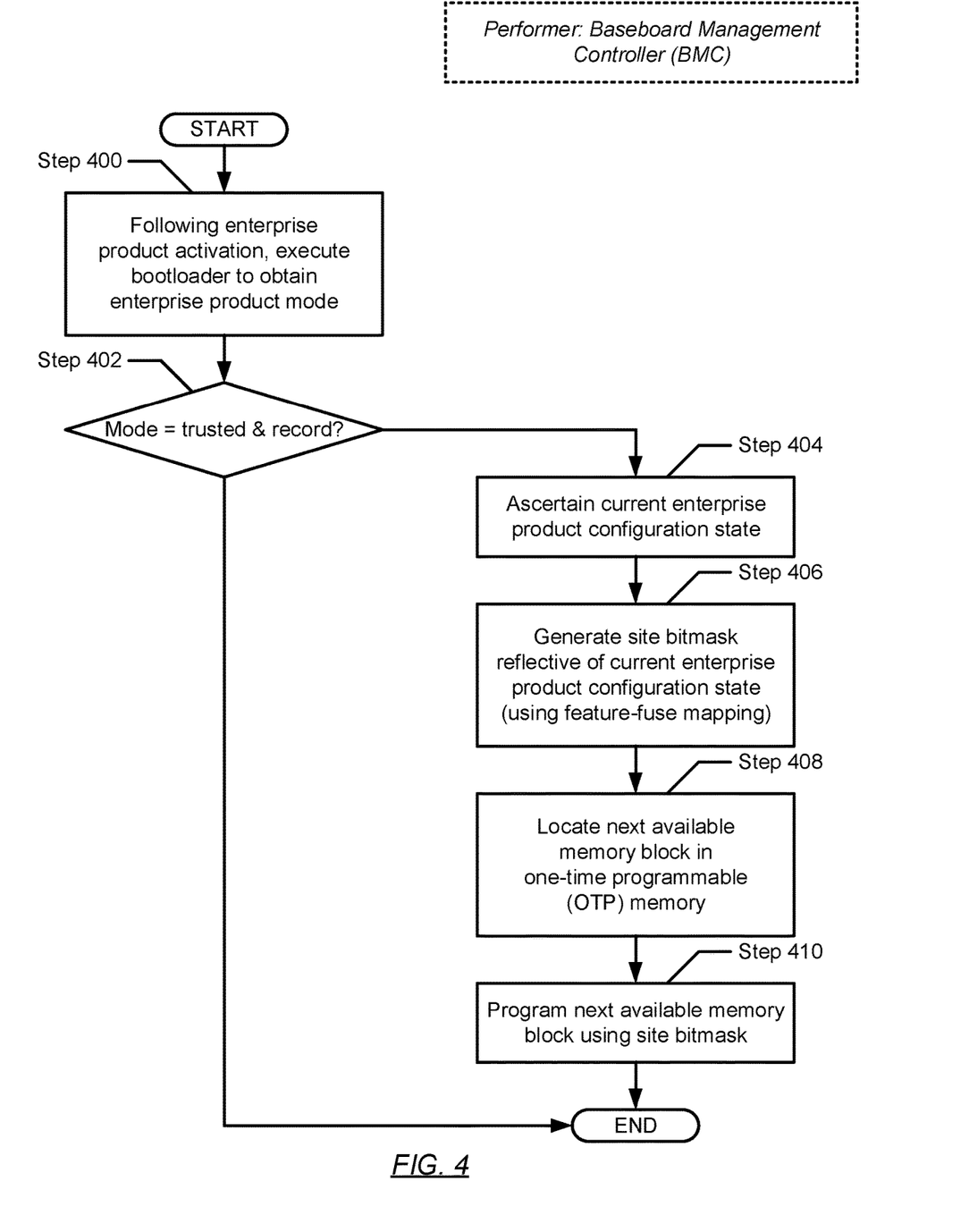
FIG. 4 shows a flowchart describing a method for immutable enterprise product configuration tracking in accordance with one or more embodiments of the invention.

FIG. 4 shows a flowchart describing a method for immutable enterprise product configuration tracking in accordance with one or more embodiments of the invention. The various steps outlined below may be performed by the baseboard management controller (BMC) (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 4, in Step 400, following the activation (e.g., power-cycling) of an enterprise product, a bootloader is executed. In one embodiment of the invention, the bootloader may refer to pre-installed software or computer readable instructions, stored in non-volatile memory, which serves to initialize varying hardware components of the enterprise product. Further, through execution of the bootloader, an enterprise product mode may be obtained. Specifically, prior to activation of the enterprise product, a baseboard thereof may be manually configured, via the application of one or more jumpers or shunts, to implement the desired enterprise product mode. Thereafter, due to the bootloader, the BMC may be programmed to perform a certain task or others based on the configuration or combination of applied jumper(s) or shunt(s).

In Step 402, a determination is made as to whether the enterprise product mode (obtained in Step 400) reflects that the enterprise product resides at a trusted lifecycle site and is set for configuration state recordation. The determination may be established based on a unique configuration or combination of jumpers or shunts manually applied to the baseboard. In one embodiment of the invention, if it is determined that the enterprise product mode is indeed reflective of the aforementioned, then the method proceeds to Step 404. On the other hand, in another embodiment of the invention, if it is alternatively determined that the enterprise product mode is not reflective of the aforementioned, then the method alternatively ends.

In Step 404, following the determination (in Step 402) that the enterprise product mode (obtained in Step 400) reflects that the enterprise product resides at a trusted lifecycle site and is set for configuration state recordation, a current enterprise product configuration state is ascertained. In one embodiment of the invention, the current enterprise product configuration state may encompass a set of indicators representative of the hardware, software, and/or firmware (or a select subset thereof) currently installed on the enterprise product. Further, ascertaining the current enterprise product configuration state may entail exercising existing features or capabilities available on any existing BMC.

In Step 406, a site bitmask is generated. In one embodiment of the invention, the site bitmask may represent a set of binary digits reflective of at least a portion of the current enterprise product configuration state (ascertained in Step 404). Each binary digit of the set of binary digits may reflect a set value (i.e., a binary one) or a clear value (i.e., a binary zero), and may map to a given enterprise product configuration feature (described above) (see e.g., FIG. 3B), which has been pre-selected to be immutably tracked. Furthermore, the predefined association, relating a binary digit of the site bitmask to a given enterprise product configuration feature, may be stored internally as a feature-fuse mapping (described above) (see e.g., FIG. 3B).

In Step 408, a next available one-time programmable (OTP) memory block is located. In one embodiment of the invention, the next available OTP memory block may refer to a pre-established size of contiguous OTP fuses in the OTP memory of the BMC, which have yet to be programmed. The size of the next available OTP memory block may equal a size of the site bitmask (generated in Step 406).

In Step 410, the next available OTP memory block (located in Step 408) is programmed to immutably retain the current enterprise product configuration state (or at least a select portion thereof) (ascertained in Step 404). In one embodiment of the invention, the next available OTP memory block may be programmed through the application of the site bitmask (generated in Step 406) thereon. More specifically, via a bitwise operation, the OTP fuses of the next available OTP memory block may each be blown (i.e., set value) or left unchanged (i.e., clear value) to take on the value of the binary digit of the site bitmask that corresponds in position to the given OTP fuse.

Figure 5:
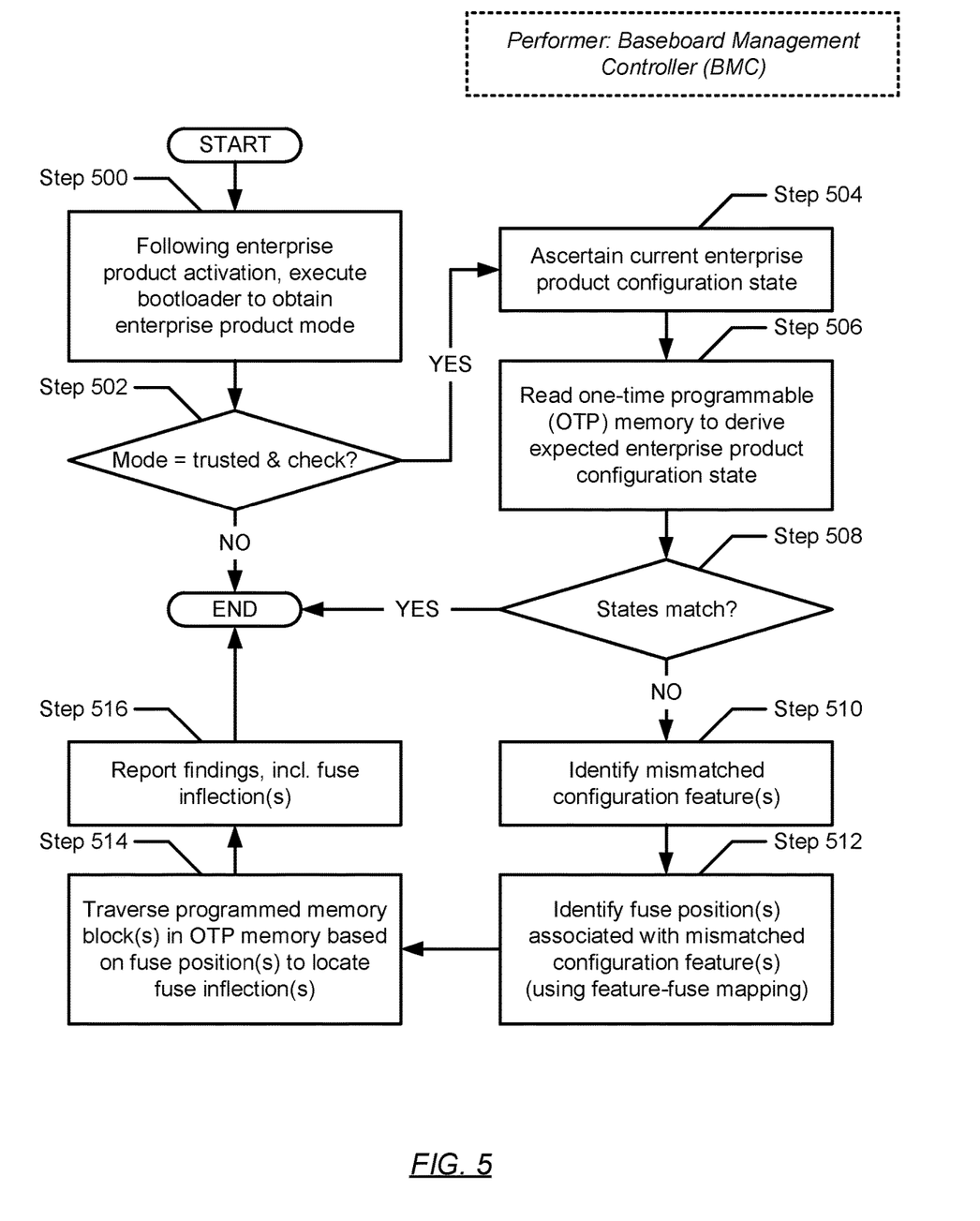
FIG. 5 shows a flowchart describing a method for checking enterprise product tampering in accordance with one or more embodiments of the invention.

FIG. 5 shows a flowchart describing a method for checking enterprise product tampering in accordance with one or more embodiments of the invention. The various steps outlined below may be performed by the baseboard management controller (BMC) (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 5, in Step 500, following the activation (e.g., power-cycling) of an enterprise product, a bootloader is executed. In one embodiment of the invention, the bootloader may refer to pre-installed software or computer readable instructions, stored in non-volatile memory, which serves to initialize varying hardware components of the enterprise product. Further, through execution of the bootloader, an enterprise product mode may be obtained. Specifically, prior to activation of the enterprise product, a baseboard thereof may be manually configured, via the application of one or more jumpers or shunts, to implement the desired enterprise product mode. Thereafter, due to the bootloader, the BMC may be programmed to perform a certain task or others based on the configuration or combination of applied jumper(s) or shunt(s).

In Step 502, a determination is made as to whether the enterprise product mode (obtained in Step 500) reflects that the enterprise product resides at a trusted lifecycle site and is set for configuration state checking. The determination may be established based on a unique configuration or combination of jumpers or shunts manually applied to the baseboard. In one embodiment of the invention, if it is determined that the enterprise product mode is indeed reflective of the aforementioned, then the method proceeds to Step 504. On the other hand, in another embodiment of the invention, if it is alternatively determined that the enterprise product mode is not reflective of the aforementioned, then the method alternatively ends.

In Step 504, following the determination (in Step 502) that the enterprise product mode (obtained in Step 500) reflects that the enterprise product resides at a trusted lifecycle site and is set for configuration state checking, a current enterprise product configuration state is ascertained. In one embodiment of the invention, the current enterprise product configuration state may encompass a set of indicators representative of the hardware, software, and/or firmware (or a select subset thereof) currently installed on the enterprise product. Further, ascertaining the current enterprise product configuration state may entail existing features or capabilities available on any existing BMC.

In Step 506, the one-time programmable (OTP) memory of the BMC is read. More specifically, in one embodiment of the invention, any previously programmed OTP memory block(s) is/are processed (e.g., via bitwise OR operation(s)) to derive a cumulative OTP memory block (described above) (see e.g., FIG. 3C). The cumulative OTP memory block may reflect an expected enterprise product configuration state, which may encompass a set of indicators representative of the hardware, software, and/or firmware (or a select subset thereof) expected to be installed on, via authorized modification(s) to, the enterprise product.

In Step 508, a determination is made as to whether the current enterprise product configuration state (ascertained in Step 504) matches the expected enterprise product configuration state (derived in Step 506). The determination may entail a bitwise comparison of the two enterprise product configuration states. Accordingly, in one embodiment of the invention, if it is determined that the two enterprise product configuration states match, then no detectable, unauthorized tampering (or unforeseen circumstances) befell the enterprise product, and the method ends. On the other hand, in another embodiment of the invention, if it is alternatively determined that the two enterprise product configuration states mismatch, then an unauthorized modification to the enterprise product has transpired, and the method proceeds to Step 510.

In Step 510, following the determination (in Step 508) that the current enterprise product configuration state (ascertained in Step 504) mismatches the expected enterprise product configuration state (derived in Step 506), a set of mismatched configuration features is identified. In one embodiment of the invention, each mismatched configuration feature may reference a hardware, software, or firmware feature, of the enterprise product, that may be indicated as installed or enabled on one of the two enterprise product configuration states and, simultaneously, may be indicated as not installed or disabled on the other of the two enterprise product configuration states.

In Step 512, a set of fuse positions, corresponding to the set of mismatched configuration features (identified in Step 510), respectively, is identified. In one embodiment of the invention, the fuse position(s) may be identified using a feature-fuse mapping (described above) (see e.g., FIG. 3B), which may represent an internally stored scheme that maps fuse positions, for OTP fuses forming any OTP memory block, to the enterprise product configuration features being tracked. Further, each fuse position may reference the fixed location of a given OTP fuse, relative to other OTP fuses, within any given OTP memory block.

In Step 514, any previously programmed OTP memory block(s), within the OTP memory of the BMC, is/are traversed. In one embodiment of the invention, the traversal, based on the set of fuse positions (identified in Step 512), may lead to discovering the location of a set of fuse inflections. Each fuse inflection may reference a difference or change, found at a given fuse position of the set of fuse positions, between any two sequential, previously programmed OTP memory blocks (see e.g., FIG. 3C). Further, the aforementioned pair of sequential, previously programmed OTP memory blocks may correspond to a pair of sequential lifecycle sites, respectively, through which the enterprise product migrated along its unique supply chain route. Each fuse inflection, therefore, may be useful to a human component in ascertaining where, along the unique supply chain route of the enterprise product, any tampering to, or other circumstances (e.g., damaged or missing hardware, malfunctioning sensors, effects from a security intrusion, etc.) imposed on, the enterprise product took place.

In Step 516, a report is generated and provided to a service technician, a product engineer, a network administrator, or any other human component concerned with the prospective tampering of the enterprise product. In one embodiment of the invention, the report may outline the findings discovered throughout the method, which may include, but are not limited to, at least a subset of the following: the current enterprise product configuration state (ascertained in Step 504); the expected enterprise product configuration state (derived in Step 506); the set of mismatched configuration features (identified in Step 510); and the set of fuse inflections (located in Step 514). The report may contain additional or alternative information without departing from the scope of the invention.

Figure 6:
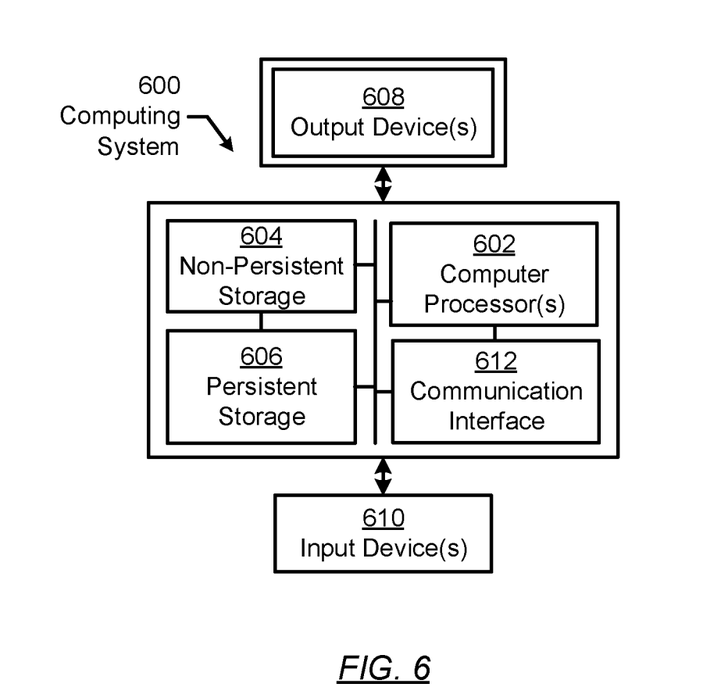
FIG. 6 shows an exemplary computing system in accordance with one or more embodiments of the invention.

FIG. 6 shows an exemplary computing system in accordance with one or more embodiments of the invention. The computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a central processing unit (CPU) and/or a graphics processing unit (GPU). The computing system (600) may also include one or more input devices (610), such as a touchscreen, keyboard, mouse, microphone, touchpad, electronic pen, or any other type of input device. Further, the communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

In one embodiment of the invention, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for enterprise product configuration tracking, the method comprising:
    having an enterprise product arrive at a first lifecycle site, wherein the first lifecycle site is one selected from a group consisting of a supplier manufacturing site (SMS), a customer staging site, and a customer deployment site, wherein the SMS at least services, upgrades, troubleshoots, tests, packages, and distributes the enterprise product;
    ascertaining, for the enterprise product, a first current enterprise product configuration state;
    generating, using a feature-fuse mapping, a site bitmask capturing at least a portion of the first current enterprise product configuration state,
        wherein the feature-fuse mapping comprises at least a configuration feature (CF) of the enterprise product desired to be tracked,
        wherein the CF specifies at least one selected from a group consisting of a requirement to install a hardware security chip, a requirement to enable a system lockdown mode, a requirement to enable a debug access path, a requirement to enable a complex programmable logic device secure boot, and a requirement to enable a subsystem attestation failure continued boot,
        wherein a one-time programmable (OTP) fuse of an OTP memory block specifies a fuse status (FS) of the OTP fuse and a second OTP fuse of the OTP memory block specifies a second FS, wherein the FS specifies the OTP fuse has been associated with the CF and the second FS specifies the second OTP has not been associated with the CF;
    locating a next available OTP memory block in OTP memory,
        wherein the next available OTP memory block refers to a pre-determined size of adjacent OTP fuses in the OTP memory that have yet to be configured,
        wherein the size of adjacent OTP fuses is equal to a size of the site bitmask; and
    preserving, immutably, the at least the portion of the first current enterprise product configuration state using the site bitmask,
        wherein the preserving is performed by programming the next available OTP memory block through a bitwise operation entailing the site bitmask.

2. The method of claim 1, wherein the feature-fuse mapping relates a set of OTP fuses forming the OTP memory block to a set of CFs available on the enterprise product.

3. The method of claim 2, wherein at least one CF of the set of CFs is not yet installed on the enterprise product.

4. The method of claim 1, the method further comprising:
    prior to ascertaining the first current enterprise product configuration state:

executing, following an activation of the enterprise product at the first lifecycle site, a bootloader to obtain an enterprise product mode; and making a determination, based on the enterprise product mode, that the first lifecycle site is a trusted facility and that the enterprise product is set for configuration state recordation, wherein the first current enterprise product configuration state is ascertained as a result of the determination.

5. The method of claim 1, the method further comprising:

after preserving, immutably, the at least the portion of the first current enterprise product configuration state:

having the enterprise product arrive at a second lifecycle site;

ascertaining, for the enterprise product, a second current enterprise product configuration state;

deriving, for the enterprise product, an expected enterprise product configuration state;

making a determination that the second current enterprise product configuration state mismatches the expected enterprise product configuration state; and reporting, based at least on the determination, an unauthorized tampering of the enterprise product.

6. The method of claim 5, wherein the expected enterprise product configuration state is derived from a set of previously programmed OTP memory blocks comprising the OTP memory block programmed to immutably preserve the second current enterprise product configuration state.

7. The method of claim 6, wherein at least one other previously programmed OTP memory block of the set of previously programmed OTP memory blocks corresponds to the second lifecycle site and immutably preserves a third current enterprise product configuration state.

8. The method of claim 5, the method further comprising:

prior to ascertaining the second current enterprise product configuration state:

executing, following an activation of the enterprise product at the second lifecycle site, a bootloader to obtain an enterprise product mode; and making a determination, based on the enterprise product mode, that the second lifecycle site is a trusted facility and that the enterprise product is set for configuration state checking, wherein the second current enterprise product configuration state is ascertained as a result of the determination.

9. A non-transitory computer readable medium (CRM) comprising computer readable program code, which when executed by a computer processor, enables the computer processor to perform a method for enterprise product configuration tracking, the method comprising:

having an enterprise product arrive at a first lifecycle site, wherein the first lifecycle site is one selected from a group consisting of a supplier manufacturing site (SMS), a customer stating site, and a customer deployment site, wherein the SMS at least services, upgrades, troubleshoots, tests, packages, and distributes the enterprise product;

ascertaining, for the enterprise product, a first current enterprise product configuration state;

generating, using a feature-fuse mapping, a site bitmask capturing at least a portion of the first current enterprise product configuration state, wherein the feature-fuse mapping comprises at least a configuration feature (CF) of the enterprise product desired to be tracked, wherein the CF specifies at least one selected from a group consisting of a requirement to install a hardware security chip, a requirement to enable a system lockdown mode, a requirement to enable a debug access path, a requirement to enable a complex programmable logic device secure boot, and a requirement to enable a subsystem attestation failure continued boot, wherein a one-time programmable (OTP) fuse of an OTP memory block specifies a fuse status (FS) of the OTP fuse and a second OTP fuse of the OTP memory block specifies a second FS, wherein the FS specifies the OTP fuse has been associated with the CF and the second FS specifies the second OTP has not been associated with the CF;

locating a next available OTP memory block in OTP memory, wherein the next available OTP memory block refers to a pre-determined size of adjacent OTP fuses in the OTP memory that have yet to be configured, wherein the size of adjacent OTP fuses is equal to a size of the site bitmask; and preserving, immutably, the at least the portion of the first current enterprise product configuration state using the site bitmask, wherein the preserving is performed by programming the next available OTP memory block through a bitwise operation entailing the site bitmask.

10. The non-transitory CRM of claim 9, wherein the feature-fuse mapping relates a set of OTP fuses forming the OTP memory block to a set of CFs available on the enterprise product.

11. The non-transitory CRM of claim 10, wherein at least one CF of the set of CFs is not yet installed on the enterprise product.

12. The non-transitory CRM of claim 9, the method further comprising:

prior to ascertaining the first current enterprise product configuration state:

executing, following an activation of the enterprise product at the first lifecycle site, a bootloader to obtain an enterprise product mode; and making a determination, based on the enterprise product mode, that the first lifecycle site is a trusted facility and that the enterprise product is set for configuration state recordation, wherein the first current enterprise product configuration state is ascertained as a result of the determination.

13. The non-transitory CRM of claim 9, the method further comprising:

after preserving, immutably, the at least the portion of the first current enterprise product configuration state:

having the enterprise product arrive at a second lifecycle site;

ascertaining, for the enterprise product, a second current enterprise product configuration state;

deriving, for the enterprise product, an expected enterprise product configuration state;

making a determination that the second current enterprise product configuration state mismatches the expected enterprise product configuration state; and reporting, based at least on the determination, an unauthorized tampering of the enterprise product.

14. The non-transitory CRM of claim 13, wherein the expected enterprise product configuration state is derived from a set of previously programmed OTP memory blocks comprising the OTP memory block programmed to immutably preserve the second current enterprise product configuration state.

15. The non-transitory CRM of claim 14, wherein at least one other previously programmed OTP memory block of the set of previously programmed OTP memory blocks corresponds to the second lifecycle site and immutably preserves a third current enterprise product configuration state.

16. The non-transitory CRM of claim 13, the method further comprising:
    prior to ascertaining the second current enterprise product configuration state:
        executing, following an activation of the enterprise product at the second lifecycle site, a bootloader to obtain an enterprise product mode; and
        making a determination, based on the enterprise product mode, that the second lifecycle site is a trusted facility and that the enterprise product is set for configuration state checking,
    wherein the second current enterprise product configuration state is ascertained as a result of the determination.

\* \* \* \* \*